United States Patent Office

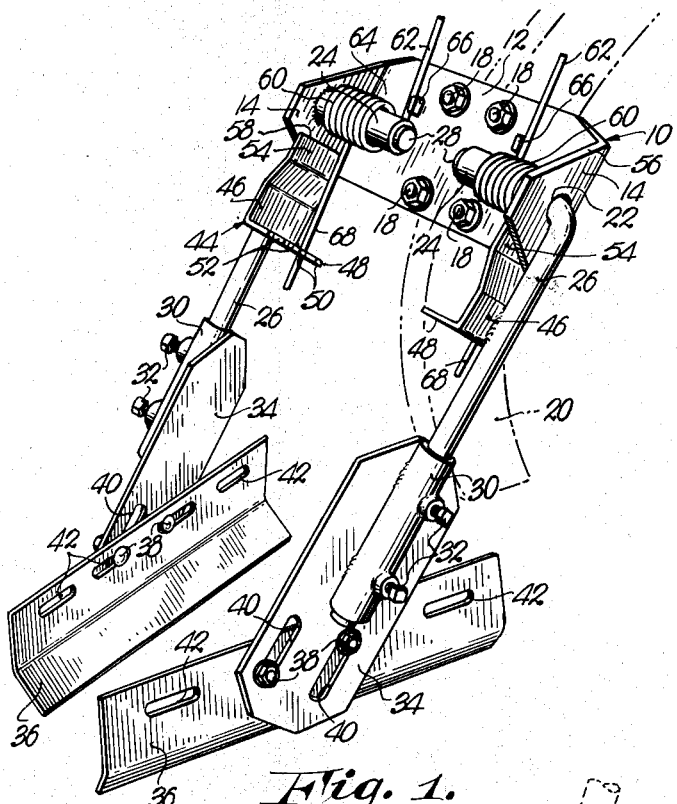
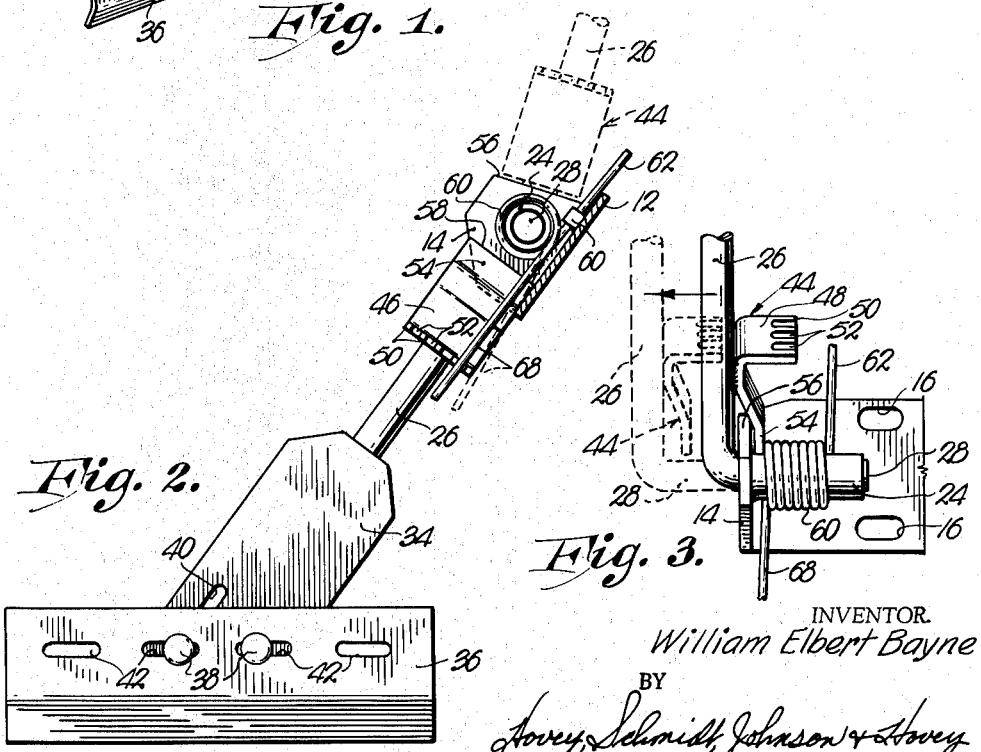
Fig. 1.
Fig. 2.
Fig. 3.
INVENTOR.
William Elbert Bayne

3,227,226
Patented Jan. 4, 1966

3,227,226
FERTILIZER SEALER HAVING INTERCHANGEABLE ARMS
William Elbert Bayne, Independence, Mo., assignor to Clark Manufacturing Company, Atherton, Mo., a corporation of Missouri
Filed Mar. 20, 1964, Ser. No. 353,353
6 Claims. (Cl. 172—705)

This invention relates to farm equipment, and more particularly, to an implement known in the trade as a sealer, and utilized with fertilizer distributors for directing a quantity of liquid fertilizer into the soil.

Fertilizer distributors of the type described generally employ a centrally disposed, arcuate blade which is drawn through the soil to form a groove or furrow therein into which the fertilizer is directed under pressure from a tube carried at the rear of an upright portion of the blade. To prevent the escape of the fertilizer from the soil immediately after deposit in the furrow, a sealer is utilized and such sealer includes a pair of ground-engaging tools on the opposite side of the furrow, the tools being carried by a pair of vertically swingable arms disposed rearwardly of the tube and extending upwardly from the tools.

To simplify the construction of the sealer and to render it more economical in cost and maintenance, it has been found that the arms of such a sealer can be identical to each other and furthermore, that means may be provided on the sealer for mounting the arms in a manner such that the arms are interchangeable with each other and can be readily replaced without regard to whether or not a right-hand arm or a left-hand arm needs to be replaced.

It is, therefore, the primary object of the present invention to provide a sealer for use with a fertilizer distributor and which is of improved construction to permit the arms which carry the furrow-closing tools to be readily interchangeable so as to simplify the construction of the sealer and to render it more economical than conventional sealers from an initial cost standpoint as well as from the viewpoint of maintenance.

Another important object of the present invention is the provision of a sealer of the aforesaid character which is provided with improved arm-locking means thereon which not only retains the arms in place throughout the range of their operating positions, but which permits the removal or the interchangeability of the arms without the use of tools and with only a minimum amount of adjustment to the ground-engaging tools carried by the arms.

Still another object of the present invention is the provision of a sealer of the type described which is of a construction permitting the aforesaid arms to be changed in the field, whereby the user of the sealer may make provision for carrying spare arms during fertilizer distribution operations and may substitute such spare arms "on the spot" as required, thus avoiding the necessity for stopping operations for long periods of time in order to make the necessary changes.

In the drawing:

FIGURE 1 is a perspective view of the improved sealer made pursuant to the concepts of the present invention;

FIG. 2 is a side elevational view of one of the arms and its associated ground-engaging tool, illustrating the locked and unlocked positions of the arms with respect to a support about which the arm is swingable; and FIG. 3 is a fragmentary view of the arm and locking means and illustrating the manner in which the arm is removed from the support.

The sealer 10 includes a support 12 in the nature of a flat plate having a pair of opposed ears 14 rigid to opposed ends thereof and projecting laterally from one face thereof. Support 12 is provided with a number of holes 16 for receiving bolt means 18, the latter serving to mount support 12 at the rear face of an arcuate shank 20 hereinafter described.

Each ear 14 has an opening 22 therethrough, openings 22 being in alignment with each other. A sleeve 24 is rigid to the inner face of each ear 14 respectively and communicates with opening 22 thereof. Sleeves 24 extend toward and are in alignment with each other.

An arm 26 is provided for each ear 14 respectively. Each arm 26 has a lateral extension 28 at one end thereof which is removably receivable within opening 22 and sleeve 24 of a corresponding ear 14 to mount arm 26 on support 12. A tube 30 is releasably secured by setscrews 32 to the opposite end of arm 26. A mounting bracket 34 is rigid to tube 30, such as by welding, and is releasably and adjustably secured to a ground-engaging tool 36 by bolt means 38 passing through slots 40 and 42 in bracket 34 and tool 36 respectively.

An irregularly-shaped element 44 is provided with a segment 46 rigid to the outer surface of each arm 26 in proximity to but spaced from extension 28 thereof. Another segment 48 is integral with segment 46 and is provided with spaced, parallel teeth 50 defining spaced slots 52 which extend substantially parallel with extension 28.

Each element 44 has a projection 54 integral with segment 46 and spaced from the corresponding arm 26 but substantially parallel to the longitudinal axis of the latter. Projection 54 is in juxtaposition to and in substantial sliding engagement with the inner face of the corresponding ear 14 when the corresponding arm 26 is in the operative position thereof illustrated in FIG. 1.

Each ear 14 has an edge 56 which is disposed to permit the edge 58 of projection 54 to clear the corresponding ear 14 and permit the removal of arm 26 from support 12 when arm 26 is in the dashed-line position of FIG. 2. When arm 26 is in such position it is moved laterally away from the corresponding ear 14 to permit removal of the arm from support 12. This is illustrated in FIG. 3 wherein arm 26 is moved outwardly of the ear 14 until extension 28 thereof clears opening 22. The dashed-line position of arm 26 in FIG. 3 indicates a position thereof as the same is being moved away from support 12.

A coil spring 60 surrounds each sleeve 24 respectively and has one end 62 normally engaging face 64 of support 12. A stop 66 engages end 62 to releasably retain spring 60 on its corresponding sleeve 24. The opposite end 68 of each spring 60 extends downwardly and is removably received in any one of the slots 52 in the corresponding segment 48. By virtue of this construction, arms 26 are biased downwardly to urge tools 36 toward and into engagement with the ground over which sealer 10 moves. By selectively positioning ends 68 of springs 60 in the proper slots 52, the bias forces of the springs 60 can be adjusted as desired.

In operation, support 12 is secured to shank 20 by bolt means 18 so that ears 14 are normally horizontally disposed. Arms 26 with tools 36 secured thereto, are mounted in operative positions by inserting arms 26 on support 12 according to the manner illustrated in FIG. 3. Ends 68 of springs 60 are disposed in the proper slots 52 to assure the correct bias force on arms 26.

An applicator knife (not shown) and its associated fertilizer delivery tube is releasably coupled to shank 20 to open a groove or furrow in the soil in advance of sealer 10 and, in this respect, sealer 10 moves in a forward direction under the influence of shank 20.

After the furrow has been opened and fertilizer deposited therein, tools 36, which are configured to direct soil inwardly toward each other, close the furrow made by the applicator blade by directing the soil into the furrow on top of the fertilizer deposited therewithin. In the event that solid objects, such as rocks or the like, are encountered by tools 36, the same will move over the obstruction because of the fact that arms 26 may swing upwardly in a vertical plane against the bias forces of springs 30. However, after passing such an obstruction, tools 36 will immediately swing downwardly once again into their usual operating positions.

Arms 26 are interchangeable with each other because of the construction of ears 14, sleeves 24, and extensions 28. If arms 26 are to be interchanged, it is a simple matter to adjust tools 36 on their associated brackets 34 so that tools 36 will be properly positioned for operation in the manner set forth above. By virtue of this interchangeability of arms 26, the user of sealer 10 may carry spare arms 26 which includes extension 28 and element 44 on each arm respectively so that arms 26 may be replaced "on the spot" in the field if necessary without tools, such as wrenches of the like, and with a minimum amount of adjustment to bolt means 38 or setscrews 32.

Ears 14 and the associated elements 44 provide locking means for the arms 26 in a manner such that the arms need only be swung from the full-line position of FIG. 2 to the dashed-line position thereof, at which position the arms 26 may be moved laterally of ears 14 and away from support 12 in order to remove the arms therefrom. This construction therefore, obviates any tools whatsoever and is of such a nature that even unskilled workmen may accomplish the removal of the arms in a minimum of time.

It is to be emphasized that when and if the arms 26 are interchanged on the support 12, the relationship between tools 36 would ordinarily become reversed. However, it is but necessary to release setscrews 32 and rotate tubes 30 on arms 26 to again place tools 36 in a position where they converge as their rearmost ends are approached. Also, it is then but necessary to release the bolt means 38 and properly tilt tools 36 with respect to brackets 34. Hence, it is not only arms 26 that are interchangeable, but no "lefts" or "rights" are provided in brackets 34 or in tools 36, thereby facilitating manufacturing and handling of the entire unit.

Having thus described the invention, what is claimed as new and desired to be secured by Letters Patent is:

1. A soil working unit comprising:
   an elongated support adapted to be mounted in a location with the ends of the support in horizontally spaced relationship;
   an arm having a ground-engaging tool extending laterally therefrom and means releasably securing said tool thereon;
   means at each end of the support respectively for removably mounting said arm on the support in an operative position for vertical swinging movement relative thereto, whereby the arm may be disposed at either end of the support;
   means releasably locking said arm in said position when said arm is mounted at either end of said support; and
   means biasing the arm in a direction to urge said tool toward and into engagement with the ground when said arm is mounted at either end of said support, said arm being movable longitudinally of said support into and out of the plane of swinging movement thereof when the arm is released from the locking action of said locking means, said arm having structure defining a longitudinally extending space, said locking means including an ear on the support, said ear being received within said space when the arm is in said operative position.

2. A soil working unit comprising: an elongated support adapted to be mounted in a location with the ends of the support in horizontally spaced relationship; an outwardly extending flange for each end of the support respectively; an arm having a ground-engaging tool thereon; means at each end of the support respectively for removably mounting said arm on the support in an operative position for vertical swinging movement relative thereto, whereby the arm may be disposed at either end of the support; a projection carried by said arm and extending along the same and defining with the arm a space therebetween, the flange of a corresponding end of the support being received within said space when the arm is in said operative position and at the last-mentioned end, whereby the arm is releasably locked to the support when it is mounted for vertical swinging movement, said arm being swingable out of said position and into a station adjacent thereto, said projection clearing said flange to permit removal of the arm therefrom when the arm is at said station; and means biasing the arm in a direction to urge said tool toward and into engagement with the ground when said arm is mounted at either end of said support.

3. A soil working unit as set forth in claim 2, wherein said mounting means includes a tube extending longitudinally of the support, said arm having a lateral extension telescopically received within said tube.

4. A soil working unit as set forth in claim 2, wherein said flange has a face and an edge at one extremity of said face adjacent said station, said projection being movable along said face when said arm is in said operative position and disposed to clear said edge when said arm is at said station.

5. A soil working unit as set forth in claim 2, wherein said mounting means includes a sleeve secured to and extending laterally from said flange, said arm having an extension rotatably received within the sleeve.

6. A soil working unit as set forth in claim 2, wherein said tool extends laterally from the arm, and including means releasably securing the tool to the arm.

References Cited by the Examiner

UNITED STATES PATENTS

| | | | |
|---|---|---|---|
| 1,202,562 | 10/1916 | Mintern | 111—85 |
| 2,424,014 | 7/1947 | Bobeldyk | 172—159 |
| 2,734,761 | 2/1956 | Allen | 292—216 |
| 2,736,279 | 2/1956 | Johnston | 172—200 X |
| 2,772,618 | 12/1956 | Schmidt | 172—193 |
| 3,157,139 | 11/1964 | Spindler | 111—7 |

ABRAHAM G. STONE, *Primary Examiner.*

T. GRAHAM CRAVER, *Examiner.*

J. R. OAKS, *Assistant Examiner.*